United States Patent [19]

Santi

[11] Patent Number: 4,984,426
[45] Date of Patent: Jan. 15, 1991

[54] CLOSED CIRCUIT SYSTEM FOR RECYCLING THE EXHAUST GASES OF A COMBUSTION ENGINE

[76] Inventor: Giunio G. Santi, Via 3a Armata 6, 34123 Trieste, Italy

[21] Appl. No.: 343,954

[22] Filed: Apr. 26, 1989

[30] Foreign Application Priority Data

May 4, 1988 [IT] Italy .............................. 20450 A/88

[51] Int. Cl.[5] .................... F01N 5/00; F02M 25/06
[52] U.S. Cl. ................................ 60/281; 60/278; 60/279; 60/309; 123/567; 123/570
[58] Field of Search ............... 60/281, 309, 279, 278; 123/567, 570

[56] References Cited

U.S. PATENT DOCUMENTS

| | | | |
|---|---|---|---|
| 1,296,116 | 3/1919 | Pfeifer | 60/281 |
| 2,884,912 | 5/1959 | Lewis | 60/309 |
| 3,559,402 | 2/1971 | Stone | 60/309 |
| 3,736,745 | 6/1973 | Karig | 60/279 |
| 3,774,391 | 11/1973 | Puttick | 123/567 |
| 3,775,976 | 12/1973 | Karig | 60/320 |
| 4,674,463 | 6/1987 | Duckworth | 60/278 |
| 4,891,939 | 1/1990 | Brighenti | 60/281 |

Primary Examiner—Douglas Hart
Attorney, Agent, or Firm—Collard, Roe and Galgano

[57] ABSTRACT

A closed circuit system using a diesel engine, or a gas turbine, operating by recycling its exhaust gases, and having a set of fuel tanks, and a set of oxygen tanks for liquid or gaseous storage. The water produced by the combustion is stored in the same fuel tanks, and the $CO_2$ produced by the combustion is stored, even in gaseous phase, in the same oxygen tanks after the tanks have been emptied of the oxygen used to support the combustion. The storage temperature is slightly above the sea water temperature and at a minimum storage pressure of 40 ata.

17 Claims, 3 Drawing Sheets fig. 5/a fig. 5/b

CLOSED CIRCUIT SYSTEM FOR RECYCLING THE EXHAUST GASES OF A COMBUSTION ENGINE

DISCUSSION OF THE PRIOR ART

This invention relates to a closed circuit system for use with diesel or gas turbine engines for recycling the exhaust gases. Internal combustion engines or gas turbines operating by recycling the exhaust gases, are improperly defined as closed circuit combustion engines while many are truly a semiclosed internal combustion engine, or a semiclosed gas turbine, for submarine use for example, is an old idea developed by several inventors of various nations. In particular the following patents relate to the subject matter of this invention are prior art. The following are U.S. patents considered of prior art:

U.S. Pat. No. 3,559,402 (Stone)
U.S. Pat. No. 3,775,976 (Karig)
U.S. Pat. No. 4,891,939 (Tecnomare).

Only the Stone, Karig and Tecnomare patents have attempted to solve the problem of transforming a semiclosed circuit into a closed circuit. Moreover, these known devices only concentrated on solving the problem related to the handling and storage of the $CO_2$ produced during combustion. The other devices concentrated only on solving the problem of how to make an I.C. engine operate by recycling the exhaust gases.

Bearing in mind that the I.C. engine capable of recycling its exhaust gases has a major application for unmanned submarines or for manned submarines, the problems which must be solved are those related to keeping the mass constant, minimizing the space allocated to the propulsion system and simplifying the entire system.

Moreover it is very important to make the system independent of ambient constraints such as the water pressure related to the operating depth, the water temperature at an operating depth which might reach an average of 37° C. either near the surface, in tropical, or mediterranean waters, or at depths near submarine volcanoes.

It must also be considered that all the components of a manned an autonomous submarine have to be contained within the so called envelope displacement and kept as small as the space dedicated to the propulsion system.

In order to overcome the above mentioned problems, Stone, Karig and Teonomare propose to store the products of combustion, namely water and $CO_2$ in specially made dedicated tanks. One or more tanks are used for the water and one or more for the $CO_2$. All of them propose to liquefy the $CO_2$ at cryogenic temperature, well below the temperature of the sea-water, in order to minimize the work of the exhaust gas compressor, which is a constant for all recycling engines.

In order to solve the problem related to the cryogenic condensation of the $CO_2$, in relation to the water temperature of the sea, (which cannot be used directly as a heat sink) all three inventors use liquid oxygen at cryogenic temperatures to support combustion. Karig and Teonomare even propose the use of LNG as fuel. The cryogenic energy of the LOX, liquid oxygen, and if available the cryogenic energy of the fuel, (LNG), is used to liquify the carbon dioxide well below the zero degree Centigrade. The liquid $CO_2$ obtained is then stored in a specially dedicated cryogenic container. In this way, while the problem related to maintaining a constant mass and this independence from water depth are solved, the system is complicated by the solutions chosen. The constraints caused by LOX storage, cryogenic cooling and dedicated cryogenic storage tanks, and the unavoidable increase of the volume of the propulsion system just to solve the problem caused by the sea-water temperature near the critical temperature of the $CO_2$ do not permit liquefaction of the $CO_2$ at any pressure.

It is therefore an object of the present invention to solve all of the five problems indicated above with a solution which is simple, functional and efficient.

BRIEF DISCUSSION OF THE INVENTION

The propulsion system of the invention when contained in a given envelope displacement of a sub is made of one or more tanks for the liquid fuel, diesel fuel or other liquid hydrocarbon, one or more tanks for the oxygen, in gaseous or liquid form, of one service tank constituted by a pressure vessel capable of receiving and containing compressed gas, one internal combustion engine or gas turbine recycling the exhaust gases, one vacuum pump/compressor and one H.P. compressor made of only the second and third stage of compression and called an "overpressor".

The carbon dioxide produced during combustion, exits as surplus from the recycling circuit of the I.C. engine or gas turbine, and is compressed at a minimum pressure of 40 ata, absolute atmosphere. It is cooled in the vicinity of its critical temperature, using sea-water, or heat sink can be in the neighborhood of 27° Centigrade. Assuming an outlet temperature of the $CO_2$, from the after cooler of the high pressure compressor or "overpressor", of around 35° C., this temperature is well above the critical temperature of the $CO_2$ that thus remains gaseous, at 40 ata, its specific weight is of about 90 kg/mc in gaseous form, equivalent to oxygen compressed to 71 ata.

Compressing the gaseous $CO_2$ to 75 ata, its specific weight will reach, at 35° C., 474 KG/mc, equivalent to gaseous oxygen compressed at about 370 ata.

Comparing these figures it appears that in relation to the charging pressure of the gaseous oxygen it is possible to obtain with the high pressure compressor/second third stage only, or "overpressor", a compressed gaseous $CO_2$ at a much lower pressure than that of the oxygen, with a specific weight equivalent to that of the gaseous oxygen stored at a much higher pressure. Thus one is in a position to exploit a storage space for the $CO_2$ produced during combustion with the same space originally set aside for the gaseous oxygen necessary for the combustion. It is therefore not necessary to liquify the $CO_2$. This represents a big advantage as for the simplicity of the plant is concerned, and for the economy of space. Moreover, in the case of the storage of liquid oxygen, it will be convenient to increase the delivery pressure of the HP compressor/second third stage only, or "overpressor", up to 120 ata; at 35° C., the specific weight of the gaseous $CO_2$ at about 800 kg/mc, compared to 1140 kg/mc of the Lox, thus minimizing the extra space required for storing the $CO_2$ produced during the combustion.

Moreover with this system, it is possible to recover the extra oxygen which is always present in the exhaust gases of any thermal plant, I. C. engine or gas turbine which operate with the so called "excess air" for the proper combustion. This is possible by taking advantage of the dramatic difference in the specific weight of the two gases.

With between 10% to 20% of oxygen in the exhaust gases, the oxygen will have a specific weight of 95 kg/mc versus the 274 kg/mc of the $CO_2$ in the gaseous mixture compressed at 75 ata and 35° C.

The I.C. engine, or the gas turbine, operating with the recycle of the exhaust gases, as universally known and in particular as described in all the patents which we have examined, can be divided in two main categories, namely semiclosed circuits, and closed circuits.

Semiclosed circuits, allows for the expulsion overboard of the $CO_2$ produced by the combustion while closed circuit requires that the $CO_2$ produced by the combustion is liquified at cryogenic temperature and than stored on board in a dedicated cryogenic tank. In both cases, the water vapor, produced by the combustion, is condensated at ambient temperature by the seawater acting as the heat sink, and thus pumped overboard or stored on board in a dedicated tank.

Other objects and features of the present invention will be considered in connection with the accompanying drawings which disclose the embodiments of the invention. It is to be understood however, that the drawings are designed for the purpose of illustration only and not as a definition of the limits of the invention.

BRIEF DESCRIPTION OF THE DRAWINGS

In the drawings, wherein similar reference characters denote similar relevance throughout the several views:

FIG. 5/a is one embodiment of a fuel tank which can be used in the invention; and, FIG. 5/b discloses another embodiment of a fuel tank of the invention.

DETAILED DESCRIPTION OF THE INVENTION

Figure 1:
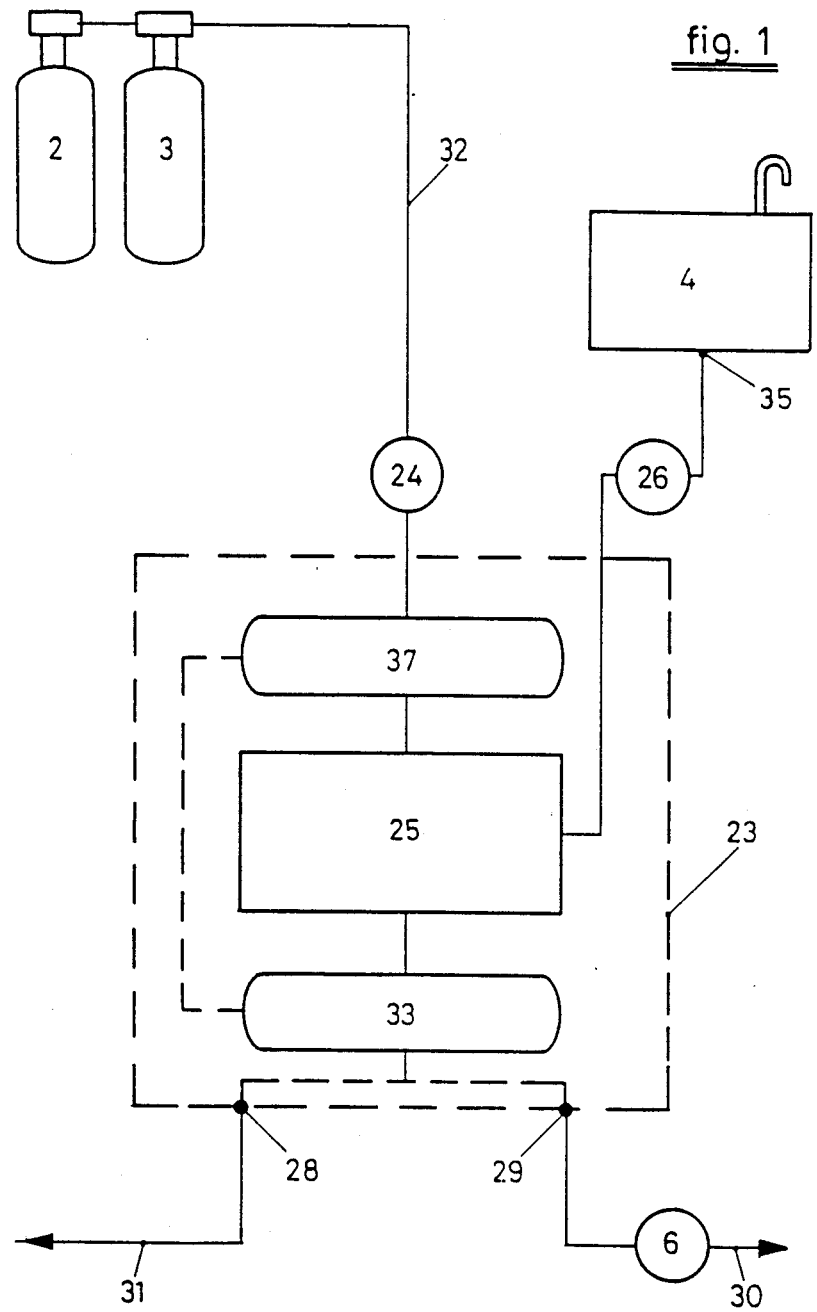
FIG. 1 is a schematic diagram of a simplified embodiment of the invention.

Referring to FIG. 1, a set of oxygen tanks, 2, 3 either liquid or gaseous, are connected through supply line 32, to a pressure reducer/metering device 24, which supplies the mixing chamber/intake manifold 37 of a diesel engine, or gas turbine, 25. One or more fuel tanks 4, equipped with an overflow pipe, or pressurizing system, supply the injection system of the combustion engine 25 with fuel via fuel pump 2G. Exhaust manifold 33 allows a portion of the exhaust gases to pass through the recycle components of the recycling circuit 23, and be recycled to mixing chamber 37, where the depleted oxygen is added by injection and diluted, a fraction corresponding to the products of combustion themselves are expelled by circuit 23 in two different parts. The water is expelled through outlet 29, and the $CO_2$, plus the residual oxygen consequent of the combustion taking place in the presence of an "excess air" is expelled through outlet 28, outlet 28 is always overpressurized with respect to chamber 37.

Water from outlet 29, produced by combustion is conveyed through a dedicated pump 6, and through line 30 to either a dedicated storage tank, or is pumped overboard.

The $CO_2$ outlet 28, and by combustion, the oxygen possibly present as consequence of the "excess air", is conveyed through line 31 and is expelled overboard, possibly after a treatment, to recover the oxygen, or is stored in a dedicated cryogenic tank according a specific circuit, not shown in FIG. 1.

It is evident from this description that in the circuits of the state of the art, as shown and described from a review of all of the patents cited earlier, there is always a compressor or equivalent device to compress the gaseous by-products of combustion similar to pump 6 for the water produced during the same combustion.

The present invention, provides an I.C. engine, or gas turbine, that recycles its exhaust gases, in a closed circuit system, without having to cyogenically liquify the $CO_2$ for storage purposes nor require dedicated tanks for the $CO_2$ or the water produced.

In the invention, the closed circuit system functions to recycle the exhaust gases at constant mass, i.e. fuel and oxygen "in" and water and Carbon dioxide "out", and comprises one or several tanks of oxygen either gaseous or liquid, or a combination of the two;

one or several tanks for the liquid fuel, generally diesel or kerosene;

one diesel engine, or gas turbine, operating to recycle its exhaust gases for submarine use;

one service tank made of a pressure vessel operating at 40 ata or greater;

one "overpressor", i.e. one high pressure compressor which can be fed with gas entering the inlet valve at a pressure above atmospheric; and one vacuum pump/compressor.

The functioning of the invention is illustrated by way of an example which should not be considered a limitation, but only as a possible variation of the invention.

DESCRIPTION OF THE PREFERRED EMBODIMENTS

Figure 2:
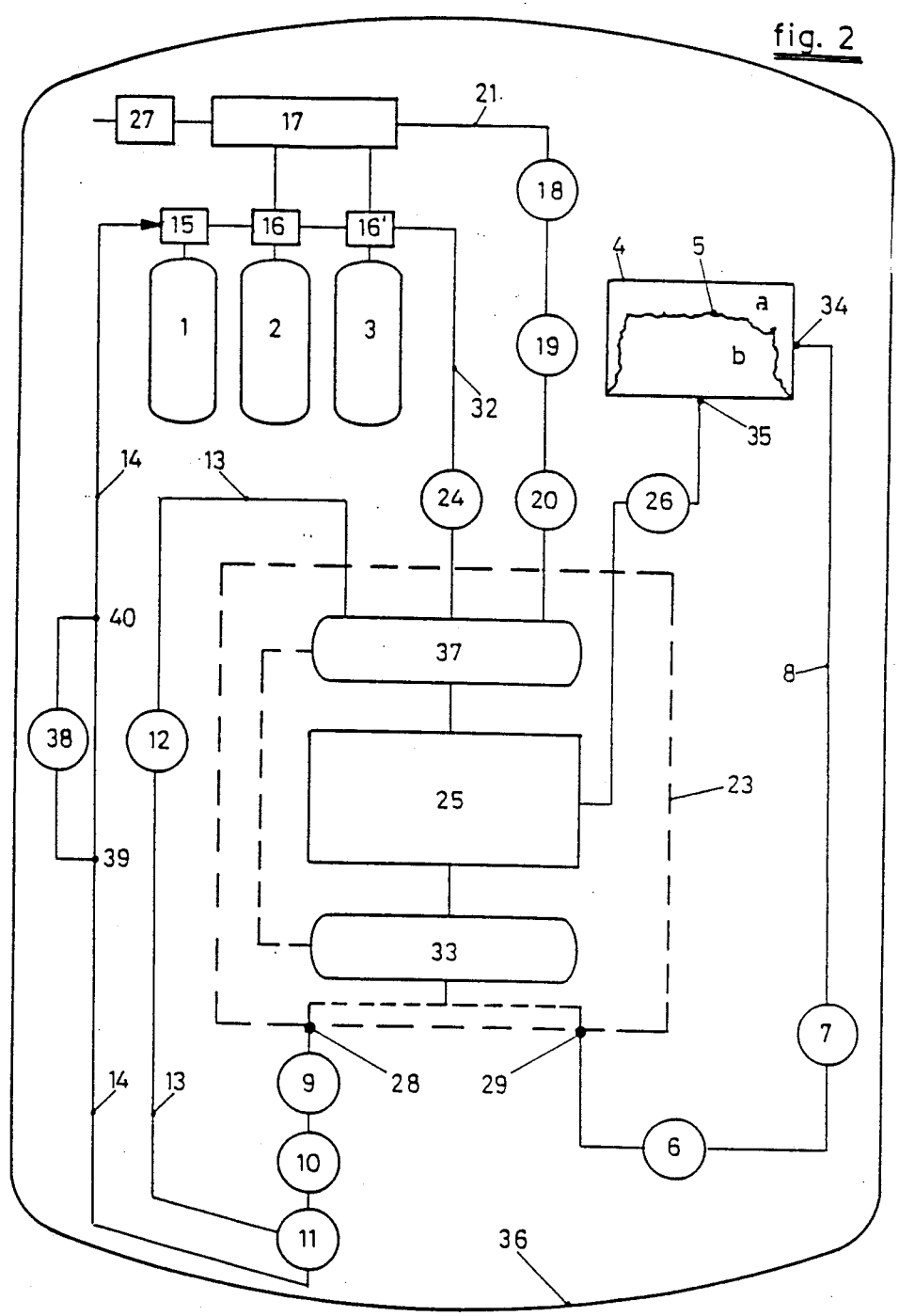
FIG. 2 is a schematic diagram of a more detailed embodiment of the invention.

Referring to FIG. 2 there is shown a closed system having a system of tanks 2, 3 containing the oxygen support of the combustion, and is completed by a service tank 1, which is an integral part of the present invention, and is always empty to 1 ata when tanks 2 and 3 are full at charging pressure. They are made of a pressure resistant vessel, and are connected to each other through valve 15 with two outlets and valves 16 and 16' with three outlets. Valves 15, 16 and 16' are equipped with a pressure reducer to maintain in the pertinent lines, the preset pressures. These tanks, through line 32, feed mixing chamber 37 of the recycle diesel engine 25 through the pressure reducer/metering valve 24. Service tank 1 and liquid or gaseous oxygen tanks 2 and 3, are also connected with manifold 17, through the valves at three outlets 16 and 16'. Manifold 17 is equipped also on one side with valve 27, and on the other and with an outlet which, through line 21, feeds vacuum pump/compressor 18, equipped with an aftercooler cooled by seawater.

The outlet of vacuum pump/compressor 18, generally a membrane compressor suitable for the compression of pure oxygen, is connected with pressure tank 19 from which, through the pressure reducer/metering valve 20, oxygen that is regulated, is conveyed to the mixing/inlet chamber 37.

Fuel tank 4, which is an integral part of the invention and which can be made of one container or several containers, is equipped internally by a flexible, water proof diaphragm 5. Diaphragm 5 divides the total volume of the fuel tank in two volumes indicated by "a" and "b". In FIG. 2, the volume designated "a" cannot be filled with fuel, while the volume "b" can only be filled with fuel. The net volume "a+b" of fuel tank 4, or of the complex of fuel tanks 4, has a total volume which is at least 3% more than the volume of the fuel loaded.

This is due to the fact that during combustion, every kg of diesel fuel, which has a specific gravity of 0.82 kg/lt and therefore a volume of about 1.22 lt, produces an average of 1.26 kg of fresh water, which has evidently a volume of 1.26 lt. Thus, every liter of diesel fuel produces at least 1.033 liters, or kg, of fresh water.

Tank or tanks 4, have two distinct inlets 35, which connect to volume "b", which has its top formed by flexible diaphragm 5, for the filling and the feeding of the fuel during the functioning of the engine. Opening 34, which is outside volume "b" and in volume "a", is used for the filling and subsequent discharge of the water produced during combustion. Volume "a" is separated by volume "b", by flexible waterproof diaphragm 5.

The fuel drawn through feed pump 26, flows inside the recycling circuit 23 to supply I.C. engine 25.

The water produced during the combustion is collected at outlet 29 of recycling circuit 23 by the water pump 6, filtered by filter 7, and pumped through line 8 to fuel tank 4 through inlet 34 positioned in volume "a". The water thus fills volume "a" and never comes into contact with the fuel, but fills the volume made available by the fuel that is consumed by the engine.

From outlet 28, where the $CO_2$ is expelled from recycling circuit 23 together with the oxygen surplus, due to combustion in "excess air", a single stage "overpressor", i.e. a high pressure compressor 9 is provided which can accept at its inlet, a gas above atmospheric pressure. A multistage intercooled "overpressor" 9, with an aftercooler cooled by sea-water circulation not shown in FIG. 2, could be used to compress the $CO_2$, or the mixture of $CO_2+O_2$, at a pressure not below 40 ata, or above that, and cool the compressed gas at a temperature in the neighborhood of 35° C. or more in order not to oversize the heat exchangers.

From overpressor 9, the cooled and compressed gas is sent to filter dehumidifier 10, and from there to gravity separator 11. From the top of separator, 11 line 13 collects the mixture, rich in oxygen content, and through pressure reducer/metering valve 12 sends it into mixing intake chamber 37 of I.C. engine 25 in recycling circuit 23. From the bottom of gravity separator 11, line 14 collects the mixture rich in $CO_2$ and sends it to valve 15.

Line 14 is equipped with by-pass valves 39–40 and the "overpressor" 38. "Overpressor" 38 is equipped with an aftercooler cooled by sea-water.

The operation of the closed circuit of the present invention, when installed within a closed volume 36 which schematizes the pressure hull of the submarine works as follows. Assuming that the submarine is exploring a shallow water area with surface water temperature around 27° C., or, a deep water volcanic area with stratifications, or layers of sea water at the same temperature. In both cases, it is mandatory to keep a constant displacement in order to keep control on the variations of depth. As soon as I.C. engine 25 is started, and running in the semiclosed mode according to the recycling circuit 23, as indicated in any of the previous inventions, the engine is consuming oxygen, either stored in liquid or gaseous form, from tanks 2 or 3, and liquid fuel supplied by tank 4, or the system made of several tanks type 4.

The water vapor produced by the combustion is condensed by recycling system 23 and through pump 6, after filtration of the unburnt particles in filter 7, stored in volume "a" or tank 4, from which tank the fuel has been supplied to the engine. As noted earlier, volume "a" of tank 4 is separated by waterproof diaphragm 5 from the fuel contained in volume "b" of the same tank and the water produced by combustion enters volume "a" through opening 34.

As indicated earlier, total volume "a+b" of tank 4 is larger than volume "b" of the fuel by at least 3%; bearing in mind that one liter of diesel fuel with specific density of 0.82 kg/liter produces during the combustion with oxygen about 1.033 kg of fresh water. Thus, about 1.033 liters of water, with the proposed system, produced by combustion, is stored on board without polluting the fuel nor requesting a new, dedicated tank, which would subtract a further volume from closed volume 36 of the submarine. This is totally different from all alternatives considered by all prior art inventions depicted in the earlier cited patents.

The system applies even if tank 4 is installed outside of pressure resistant volume 36, but within the "envelope displacement" of the submarine, in order not to pollute either the fuel or the sea with the pollutant which cannot be filtered.

The carbon dioxide and the residual oxygen present in the exhaust gases, as a consequence of the combustion taking place with an "excess air", are expelled from outlet 28 of recycling circuit 23 with a certain pressure greater than atmospheric. Such an overpressure depends on the solution selected in the manufacturing of recycle circuit 23 but there is always an overpressure of some kind as indicated in all the prior art patents cited.

With this pressure greater than atmospheric, these prior art devices use an exit from outlet 28 to enter on the "overpressor" 9, single stage or multistage with intercooler, and aftercooler, all cooled by the sea-water which acts as a heat sink.

As mentioned earlier, the "overpressor" is a high pressure compressor, mono or multi stage, which can accept at its inlet, a gas with a pressure well above atmospheric pressure. In the last aftercooler, which is part of "overpressor" 9 and which is not specifically indicated in FIG. 2, the sea-water will cool the compressed mixture at a temperature which will be above the critical temperature of the $CO_2$, namely above 31°.5 centigrade. Therefore the mixture, always in the gaseous phase, will be conveyed to the filter/dehumidifier 10, in order to purify the gaseous mixture from traces of unburnt particles, luboil etc., and to eliminate the water vapor still present, and will then be conveyed to gravity separator 11.

In the present invention, the minimum delivery pressure of the "overpressor" 9 in order to allow proper gravity separation; must be 40 ata, and therefore the minimum working pressure of the gravity separator must be 40 ata as well. Assuming that the volumetric oxygen percentages in the exhaust gases is about 10%, and having set the minimum set pressure of the separator at 40 ata, there will be a partial pressure of the $CO_2$ of 36.0 ata and of the oxygen of 4 ata. Under these conditions, even if the temperature is as little as 32° C., the specific weight of the $CO_2$ is about 85 kg/mc while that of the oxygen is about 50 kg/mc.

Figure 3:
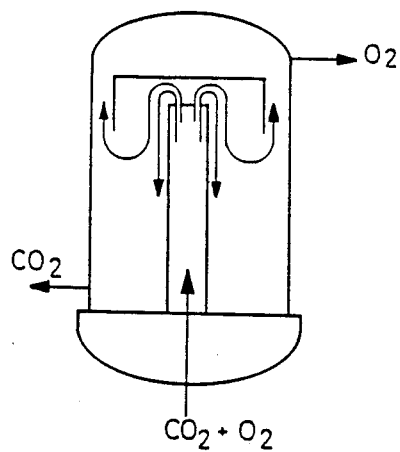
FIG. 3 is a schematic diagram of a gravity separator according to the invention.

Thus when entering the gaseous mixture in gravity separator 11, build according the principle of FIG. 3, the higher part will concentrate the light fraction while in the lower part will concentrate the heavy fraction.

From the higher part of separator 11, (FIG. 2) line 13 extracts and conveys the lighter fraction, enriched with $O_2$, to valve 12. Valve 12, a pressure reducing/metering valve, maintains in circuit 13 a minimum pressure of 40 ata, reduces the pressure, and meters the light fraction to mixing intake chamber 37 of I.C. engine 25.

From the lower part of separator 11, line 14 flows the heavier gaseous fraction, rich in $CO_2$, to valve 15, a pressure reducer which maintains in line 14 the minimum pressure of 40 ata as in the gravity separator 11, and fills service tank 1, (which initially is empty) at the delivery of "overpressor 9".

During this phase, the I.C. engine, or the gas turbine, is supplied with oxygen from tank 2, or systems of tanks 2, through three way valve 16 turned in such a way so as to connect line 32 with tank 2. Three way valve 16' is turned in such a way as to close oxygen tank 3, or the set of oxygen tanks 3, but allows the flow of oxygen from tank 2 to line 32.

Under these conditions, the circuit as described, and as contained in submarine volume 36 is fully closed and the mass is kept rigorously constant within the volume. Nothing goes in or out from submarine 36. As oxygen tank 2 approaches depletion, valve 16 will be turned from line 32 to line 21 through manifold 17. Vacuum pump/compressor 18 will start drawing oxygen, from the depleted tank, or tanks, filling pressure tank 19 and, in doing so keeps the supply of oxygen to mixing chamber 37, of the I.C. engine with exhaust recycling, through pressure reducer/metering valve 20. Vacuum pump/compressor 18, and pressure tank 19 are designed so as to empty oxygen tanks 2, before service pressure tank 1 is filled to its maximum capacity.

When oxygen tank 2, or system of tanks 2 is near full depletion, three way valve 16' opens oxygen tank(s) 3, to mixing chamber 37 through line 32, and pressure reducer/metering valve 24.

It is possible also to operate this connection when oxygen tank 2 is fully depleted. In this case, the vacuum pump/compressor 18 is designed with a volumetric delivery well above the volumetric oxygen consumption of engine 25.

Once tank 2 is depleted from its original oxygen content, tank 1 is connected with tank 2, now empty from its original oxygen charge.

Thus, there is now available a new volume, previously occupied by the oxygen, ready to accept $CO_2$ produced by the combustion of fuel from tank 4 with oxygen from tank 3, even if the $CO_2$ is in gaseous form, since the 27° centigrade temperature of the sea-water acts as heat sink. In the present invention, any exhaust gas recycling system for any I.C. engine, or gas turbine, built according to one of the cited patents or any other system, is made completely closed maintaining a constant mass in relation to the submarine volume 36, without having extra tanks for the water produced, or cryogenic or extra tanks for the $CO_2$ produced, and uses the minimum energy for compression, in spite of the fact that the sea-water temperature is near the critical point of $CO_2$. In this invention, the water produced during combustion is stored in the same tank used for the fuel.

Also, the $CO_2$ produced during the combustion is stored in the same tanks used for the oxygen without the need of liquification, regardless of the water depth and of the sea-water temperature. Moreover, because of this system, the oxygen present in the exhaust gases is separated from the gaseous $CO_2$ and recovered for combustion.

Pressure resistant service tank 1, vacuum pump/compressor 18, fuel tank 4 with diaphragm 5, overpressor 9, and gravity separator 11, which represent the hard core of the invention, can undergo all the constructional and circuital variation consequence of the opportunities offered by the technology without substracting any thing from the originality of the invention.

Figure 4:
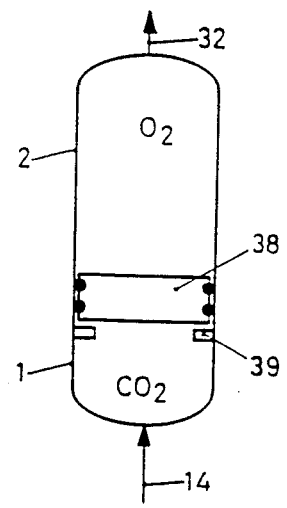
FIG. 4 is a schematic diagram of a service tank that is pressure resistant.
Figure 4:
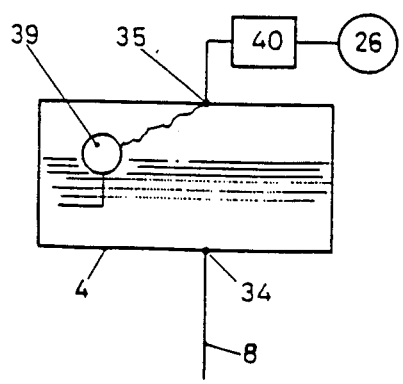
Figure 4:
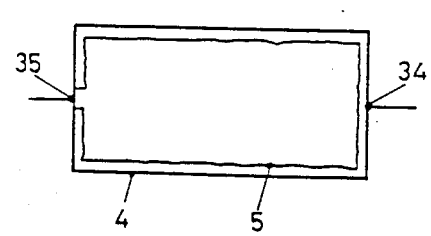

For example in FIG. 4 there is shown a possible variation in the assembly of a service tank 1 which is pressure resistant, and oxygen tanks 2 and 3. In the same pressure vessel, service tank 1 and oxygen tank 2 are made by a mobile piston 38 with gaskets, which rests on stops 39, so dividing the same tank in two separate volumes indicated as $CO_2$ and $O_2$.

In this case, (see FIG. 2) once the volume of $CO_2$ has been filled by "overpressor" 9, overpressor 38 intervenes, equipped with intercoolers and aftercoolers refrigerated by seawater with the operation of by-pass 39-40. In this way it is possible to make full use of the total volume 2.

It is evident, for example, that "overpressor" 9 and "overpressor" 38 can be embodied in one "overpressor" only. Vacuum pump/compressor 18 can be a rotary machine, in lieu of a membrane machine, or a reciprocating machine. Fuel tank 4 can be manufactured, in alternative, as indicated in FIG. 5/a or 5/b.

In FIG. 5/a, fuel tank 4, is rigid or collapsible. Intake 35 for the fuel is equipped with a float 39 for the suction of fuel supply pump 26, always drawing from the top of the liquid.

In this case, ahead of the intake of the pump a fuel/water separator is installed, to eliminate the polluting water.

Supply line 8 for the water produced during combustion has inlet 34 installed in the lower part of the tank, which in any case will have a total volume well above the minimum 3% over the volume of fuel, as set in the previous pages.

In FIG. 5/b, tank 4, rigid or collapsible, contains within itself a second collapsible tank 5'. In the solution shown in FIG. 5/b, the fuel is contained within collapsible tank 5, therefore the volume between tank 4 and 5 must be more than the 3% indicated, to take care also of the volume of tank 5 once the tank has collapsed.

At the end of the mission, tanks 1, 2 and 3, or the systems of tanks 1, 2 and 3 will be thoroughly washed with a solvent, such as freon for example, after having been emptied through valve 27. The washing will take place through same valve 27 and vacuum pump/compressor 18 and pressure reducer/metering valve 19 by means of an "ad-hoc" bypass not shown in FIG. 2.

What is claimed is:

1. A closed circuit system having an engine operating by recycling the exhaust gases, and including a set of fuel tanks and a set of oxygen tanks for liquid or gaseous oxygen comprising;

means for storing the water produced by the combustion in the same fuel tanks, means for storing the $CO_2$ produced by the combustion, even in gaseous phase, in the same oxygen tanks after said tanks have been emptied of oxygen used to support the combustion, and wherein the storage temperature is slightly above the sea water temperature at a minimum storage pressure of 40 ata (absolute atmospheres).

2. The closed circuit system is set forth in claim 1, wherein each tank for the liquid fuel comprises a flexible waterproof diaphragm disposed within the tank to separate the fuel from the water produced by the combustion, said water being pumped in to said fuel tank during operation of the engine in a compartment formed by set diaphragm.

3. The closed circuit system as set forth in claim 2, wherein the total volume of the fuel tank separated by the flexible diaphragm, has a net volume which is larger by at least 3% than the total volume of the stored fuel.

4. The closed circuit system as set forth in claim 3, wherein the fuel tank does not overflow freely in the volume of the submarine.

5. The closed circuit system as set forth in claim 1, wherein the water produced during combustion is filtered in order to remove unburnt particles and other impurities before being stored in the same fuel tank from which the fuel has been supplied to the engine.

6. The closed circuit system as set forth in claim 1, wherein for the recovery of the $CO_2$ produced by the combustion, there is one service tank made of a pressure resistant vessel which can contain in weight at least the $CO_2$ equivalent to the one produced by the oxygen contained in the oxygen tank, so that the oxygen tank can be fully emptied while the service tank is filled with $CO_2$, the oxygen being fed to the recycled engine and the $CO_2$ being produced by the same engine.

7. The closed circuit system as set forth in claim 6, wherein in the circuit of the oxygen supply to the engine, operating so as to recycle the exhaust gases, there is additionally comprising a vacuum pump/compressor which allows for the total emptying of each oxygen tank after said tank has reached its minimum supply pressure to said engine.

8. The closed circuit system as set forth in claim 7, wherein said vacuum pump/compressor completely deplete the oxygen tanks, after they have reached the minimum engine supply pressure, filling at the same time, an auxiliary pressure vessel from which to supply, at the standard supply pressure, the engine operating with the recycle of the exhaust gases, with the oxygen recovered in such manner.

9. The closed circuit system, as set forth in claim 8, wherein the $CO_2$ produced by the combustion, and the residual oxygen, if any, present in the exhaust gases, are extracted from the recycled system itself and used to supply a medium/high pressure compressor, or "overpressor", mono or multi stage with intercooler and aftercooler cooled by the sea water at sea pressure and temperature, which "overpressor" compresses said gases to a minimum pressure of 40 ata, absolute atmospheres, regardless of the water depth and of the seawater temperature.

10. The closed circuit system as set forth in claim 9, wherein the maximum pressure of the "overpressor" is 125 ata (absolute atmospheres) regardless of the water depth and of the sea water temperature.

11. The closed circuit system as set forth in claim 10, wherein after following said "overpressor", there is comprised a filter having a filtering capacity of 10 micron.

12. The closed circuit system as set forth in claim 11, wherein following filtration, the gaseous $CO_2$ and the $O_2$ fraction are dehumidified.

13. The closed circuit system as set forth in claim 12, wherein the $CO_2$ and the $O_2$ in gaseous phases are separated by gravity.

14. The closed circuit system as set forth in claim 13, wherein the separated $CO_2$ is stored, or liquid form, in said pressure service tank.

15. The closed circuit system as set forth in claim 14, wherein during the filling of said pressure service tank, the oxygen tank is completely emptied, wherein the weight of the oxygen is equivalent to the weight of the $CO_2$ produced by the combustion supported by the same oxygen, and the $CO_2$ stored in said service pressure tank.

16. The closed circuit system as set forth in claim 15 comprising a set of valves for emptying the oxygen tanks from the products of combustion, and using said valves to clean the tanks with cleaning fluids such as freon.

17. The closed circuit system as set forth in claim 16, wherein the components of said system are contained in an envelope displacement comprising a closed circuit system of constant mass since the products of combustion are not expelled overboard, but are kept within the said envelope displacement in the fuel and oxygen tanks formally emptied of fuel and oxygen.

* * * * *